United States Patent [19]

Weisshaupt et al.

[11] Patent Number: 5,280,435
[45] Date of Patent: Jan. 18, 1994

[54] IDENTIFICATION SYSTEM HAVING A PLURALITY OF DEVICES FOR READING, WRITING AND RECOGNIZING A CODE AND A PLURALITY OF CODE CARRIERS AND ASSOCIATED PROCESS

[75] Inventors: Bruno Weisshaupt; Daniel Züllig, both of Frauenfeld, Switzerland

[73] Assignee: Baumer Electric AG, Frauenfeld, Switzerland

[21] Appl. No.: 512,573

[22] Filed: Apr. 9, 1990

Related U.S. Application Data

[63] Continuation of Ser. No. 181,050, Apr. 13, 1988, abandoned.

[30] Foreign Application Priority Data

May 8, 1987 [CH] Switzerland ............... 01773/87

[51] Int. Cl.$^5$ .................................................. G07C 9/00
[52] U.S. Cl. .................................... 364/514; 342/44
[58] Field of Search ............... 364/514; 340/870.19, 340/870.34, 825.54, 825.34, 825.35; 128/419; 342/44

[56] References Cited

U.S. PATENT DOCUMENTS

| | | | |
|---|---|---|---|
| 3,899,671 | 8/1975 | Stover | 364/514 |
| 4,390,022 | 6/1983 | Calfee et al. | 128/419 PG |
| 4,424,812 | 1/1984 | Lesnick | 128/419 PG |
| 4,571,589 | 2/1986 | Slocum et al. | 340/870.19 |
| 4,676,248 | 6/1987 | Berntson | 128/419 PG |
| 4,712,555 | 12/1987 | Thornander et al. | 128/419 PG |
| 4,750,494 | 6/1988 | King | 128/419 PG |
| 4,843,259 | 6/1989 | Weisshaupt | 307/308 |
| 4,873,980 | 10/1989 | Schaldach | 128/419 PG |

FOREIGN PATENT DOCUMENTS

| | | |
|---|---|---|
| 0040544 | of 1981 | European Pat. Off. |
| 0101125 | of 1984 | European Pat. Off. |
| 0142436 | of 1985 | European Pat. Off. |
| 0204542 | of 1986 | European Pat. Off. |

*Primary Examiner*—Jack B. Harvey
*Assistant Examiner*—Ellis B. Ramirez
*Attorney, Agent, or Firm*—Walter C. Farley

[57] ABSTRACT

The identification system operates by the contactless, inductive transmission of information via oscillatory circuits coupled by an electromagnetic field. Excitation is produced by pulses representing the information; the pulse response is utilized. The associated apparatus has one or more pairs of oscillatory circuits (A1/B1;A2/B-2;A3/B3) and means (21, 22, 23) for processing the pulse response. A position recognition process transmits test information which is used for the sequential short-circuiting of an oscillatory circuit on the receiver side. This oscillatory circuit behaves like a damped/undamped body as a function of the test function. The partner oscillatory circuit on the transmitter side is excited at, for example, twice the frequency of the test frequency and its pulse response contains the test function through the defined damping behaviour. If the test function is again recognized as a result, the connection is correct and write or read operation is released. If the switch is operated not with a test function, but with a switching sequence of electric values representing data from a store, excitation produced in the partner oscillatory circuit by an interrogation coil can produce a pulse response which contains the data from the store.

10 Claims, 5 Drawing Sheets

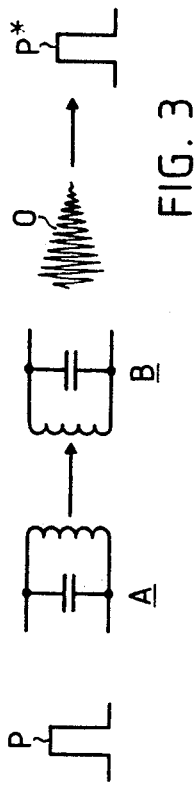
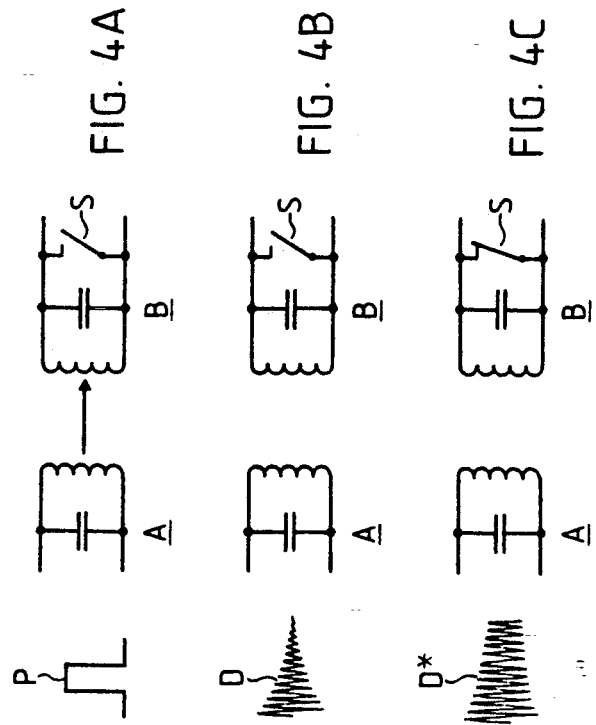
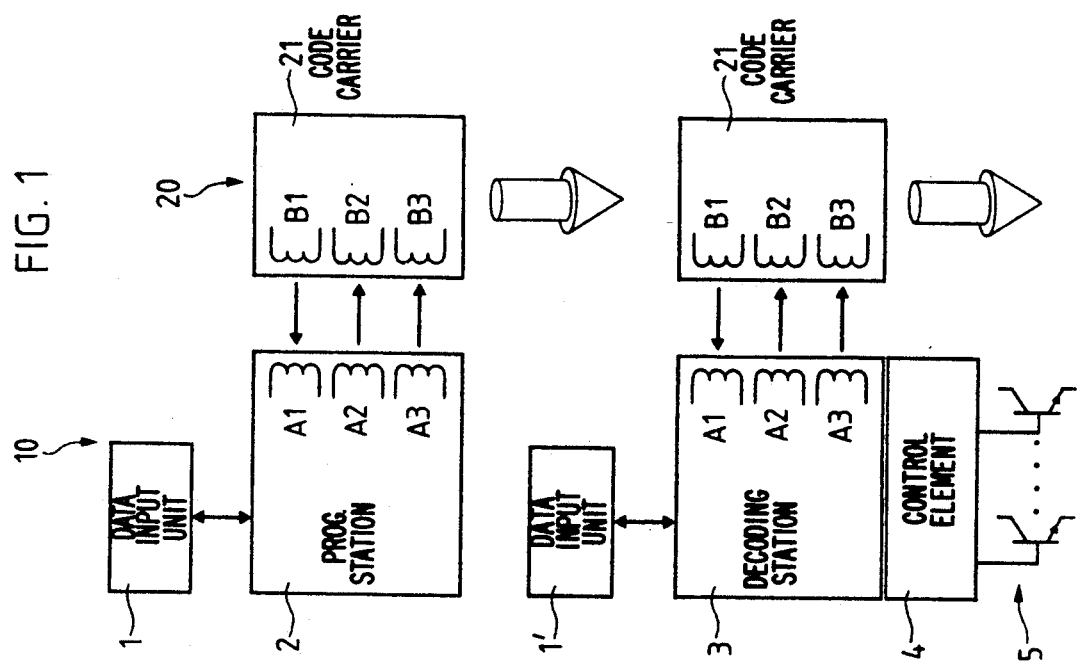

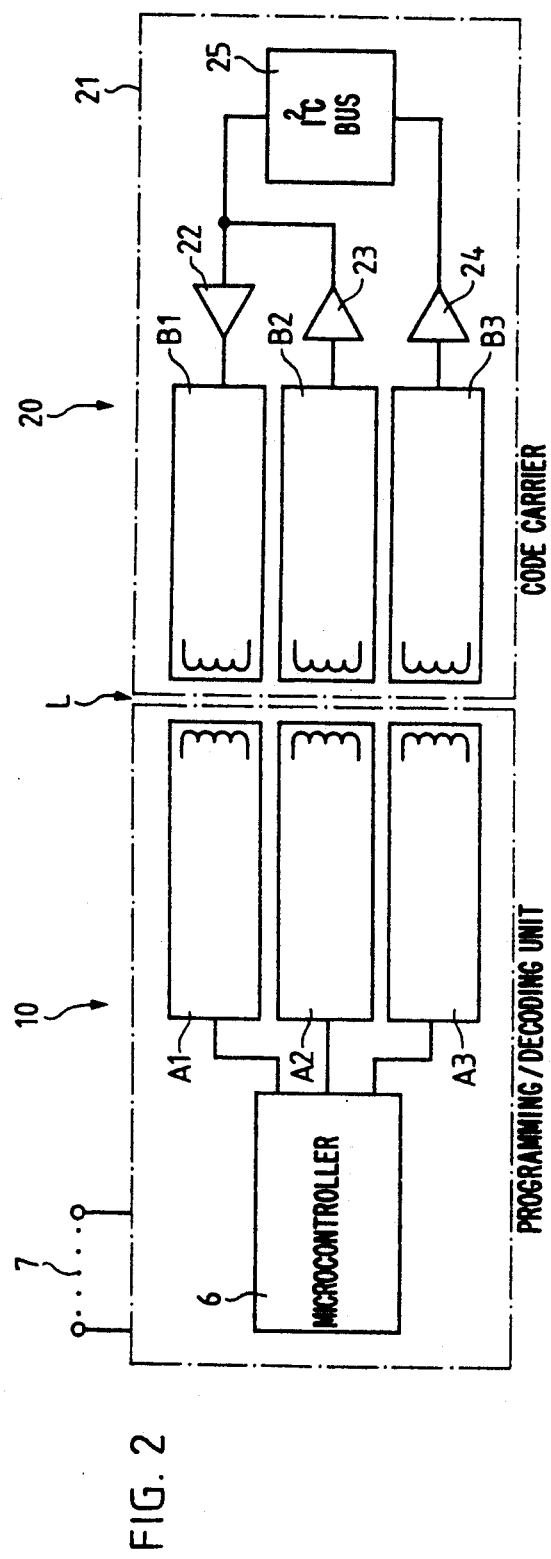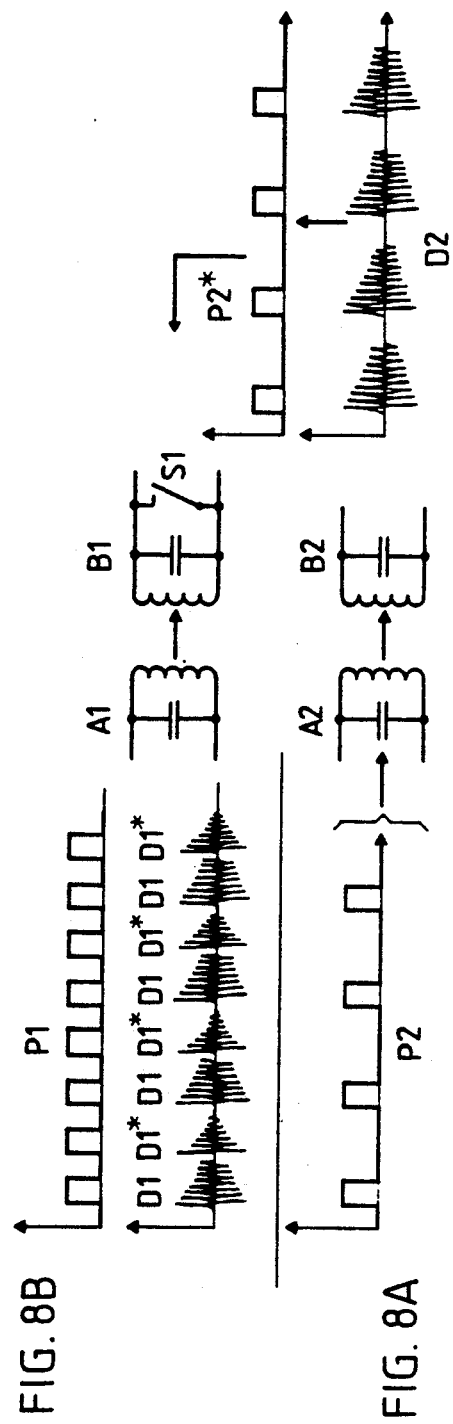

IDENTIFICATION SYSTEM HAVING A PLURALITY OF DEVICES FOR READING, WRITING AND RECOGNIZING A CODE AND A PLURALITY OF CODE CARRIERS AND ASSOCIATED PROCESS

This application is a continuation of Ser. No. 07/181,050, filed Apr. 13, 1988, now abandoned.

The invention is in the field of devising, transmitting and identifying codes and relates to an identification system comprising one or more code read-write units and a plurality of code carriers, the invention also relating to an operating and positioning process for the apparatus.

BACKGROUND OF THE INVENTION

It is the object of identification systems to bring articles of any kind together in place and time transiently to form a systematic whole. To this end as a rule the articles are provided with a code carrier, code readers or rather code announcers being located at predetermined places to-determine on the one hand the article itself (identification) and on the other hand its time and place (location). The systematic whole is obtained by bringing these "announcements" together for data processing by data processing means.

Generally the code is transmitted in a contactless manner, for example, by optical or electromagnetic transmission processes, the main problem being to achieve complete, reliable code transmission, if necessary in the shortest possible time. Positioning errors of the code carrier in front of the code reader lead to deficient reading speeds or altogether faulty performance, so that the positioning and recognition of the correct position of a code carrier in front of a read-write location is one of the basic preconditions for the operation of an identification system.

SUMMARY OF THE INVENTION

It is an object of the invention to provide an apparatus with code carrier for the reading and writing of a code from or to a code carrier, with simultaneous, reliable position recognition in both static and dynamic operation, and also to provide a process for operating the apparatus and a process for recognizing the position of a code carrier in relation to a read-write unit. The problem is solved in such a manner that flexible and organizationally open identification systems can be devised with the apparatus. The apparatus is a coding-read-write station with an associated coding element, with the possible use of a plurality of both units (each coding-read-write station cooperates with each code carrier). The object of the operating process is to overcome difficulties of inductive, contactless signal transmission, that of the process of position recognition being to obviate faulty transmissions of data.

Briefly described, the invention comprises a process for contactless inductive transmission of data between a pair of cooperating first and second oscillatory circuits, comprising the steps of providing first and second circuits each having an inductive member, at least one of the circuits being movable to a position relative to the other in which each inductive member is within the range of influence of the electromagnetic field of the other, and selectively transmitting data from the first circuit with a first data signal comprising a series of discrete pulses to induce through the electromagnetic field in the second circuit a pulse response which is retransformed into a second data signal comprising a series of discrete pulses, or selectively transmitting data from the second circuit to the first circuit by exciting the first circuit with a sequence of discrete pulses, sequentially damping and not damping the second circuit in a pattern in accordance with a first data signal composed of a series of discrete pulses and inducing in the first circuit a pulse response comprising a second data signal composed of a series of discrete pulses.

An embodiment of the apparatus, its operating process and the process of position recognition will now be discussed in detail with reference to the accompanying drawings.

BRIEF DESCRIPTION OF THE DRAWINGS

FIG. 1 illustrates the principle of the apparatus, subdivided into a coding part and a decoding part.

FIG. 2 shows the apparatus in detail in the form of a sensor.

FIG. 3 shows diagrammatically the principle of signal transmission as performed in the operating process and FIGS. 4A, B, C diagrammatically the principle of short-circuit control, as used in the process for position recognition. The recognition operation is illustrated, FIGS. 5, 6, 7 transmission signals in connection with the operating process.

FIGS. 8A and 8B show an example of the operation of the signal transmission channels A1/B1 and A2/B2 for position recognition.

DETAILED DESCRIPTION OF THE PREFERRED EMBODIMENT

Figure 6:
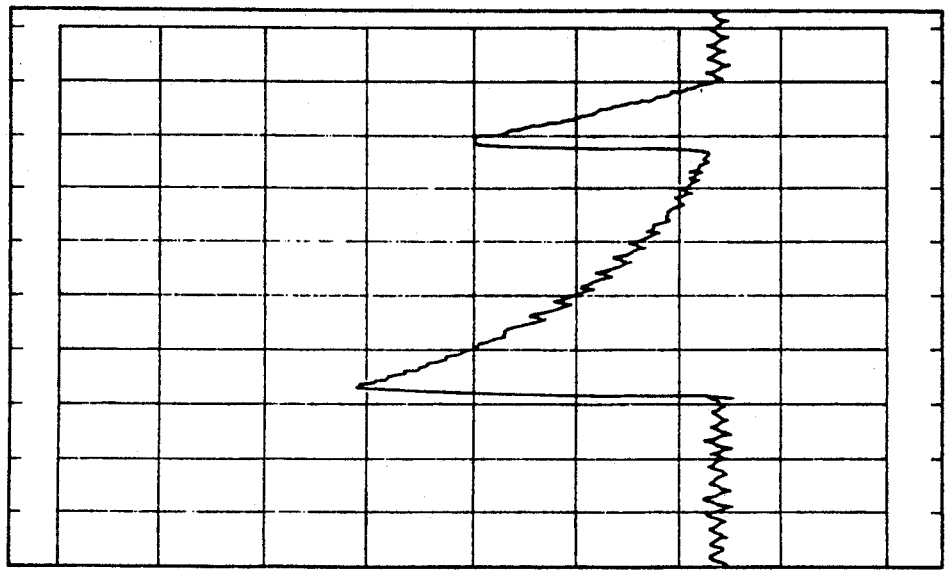

The process according to the invention is a contactless transmission process and uses the inductive transmission of signals by means of pulse excitation and pulse response utilization as disclosed in Swiss Patent Application No. 4289/86 entitled: "Process for the contactless detection of eddy-current-induced bodies, more particularly metallic objects, and sensors based on the process". The U.S., counterpart to this application is U.S. Pat. No. 4,843,259. However as will be explained in detail hereinafter, no eddy-current-induced body is required for detection, such detection or "control" being performed via a purely electronic step, as shown in FIG. 3 and FIGS. 4A, B, C. FIG. 3 shows two oscillatory circuits A and B located in a spatial relation to one another. The oscillatory circuit A is excited by a square wave pulse P to be transmitted in this case, by way of example, to the oscillatory circuit B. The oscillatory circuit B reacts to the rising pulse flank of the pulse P from the oscillatory circuit A with an oscillating signal O, which is processed, for example, by a monostable flip-flop and/or a Schmitt-trigger to form a pulse P*.

The pulse response on the side of the excited oscillatory circuit A, the envelope of the decay signal, depends on the degree of damping and therefore directly on the distance of a damping body from the excited oscillatory circuit, this being, for example, an eddy-current-induced body. In the process according to the invention, however, the pulse response does not depend on an eddy-current-induced body, but on a code element provided in accordance with the invention and brought into the vicinity of the coil of the oscillatory circuit. The effect of an eddy-current-induced body is simulated by an (open) oscillatory circuit. FIGS. 4A, B, C show these facts. FIG. 4A, similar to FIG. 3, shows an arrangement of two oscillatory circuits A, B, the oscillatory circuit B having a switch S, the opening and closure of which controls the two conditions "damped" and "undamped". If the switch S is open (FIG. 4B), it is possible to transmit from A to B or from B to A a pulse which provokes in A a pulse response D with a heavier signal decay than would be the case than with an undamped pulse response. If the switch S is closed, the oscillatory circuit B behaves like an undamped body (FIG. 4C). With switch S open, it is possible to transmit from B to A a pulse whose response will be a signal with a damped decay; of course, this takes place similarly if a pulse is transmitted from A to B. With switch S closed, a pulse can be delivered from A to the short-circuited oscillatory circuit B, the pulse response from the oscillatory circuit A being a signal with undamped decay. On side A, therefore, a damped signal is received if the side B can oscillate freely, while an undamped signal is received on the side A when the side B is short-circuited. Both conditions require a predetermined spatial alignment of the coils of the two oscillatory circuits in relation to one another, in the ideal case the largest possible coupling being with the coil apertures precisely opposite one another.

These circumstances are used for rapid, high-precision positioning. The term positioning means not only the static operation—i.e., a stoppage of the code carrier in front of the read-write part, but also the correct and moreover operative data transmission position of a code carrier in movement. In dependence on its speed, a code carrier moving past the read-write and timing part can transmit a varying number of data bits. The time window "open" or usable for this operation is limited on the one hand by the speed and on the other hand by the local range of influence of the oscillatory circuits (spread of the field). Within this time window, data transmission is possible if the position of the code carrier at that moment is correct. The correct and operative position in stoppage and movement forms part of the process according to the invention and will be further described in detail hereinafter in connection with FIG. 8.

FIG. 1 illustrates in principle an example of a system according to the invention which uses these facts to write and/or read a code. The left-hand side of FIG. 1 shows a coding-decoding station 10 with input and output (final control elements), the right-hand side of the drawing showing the plurality 20, 21 of all code carriers. The round arrows symbolize a continuous flow of code carriers which are dealt with and processed by the or each station on the left-hand side. A code carrier 21 from the plurality of all code carriers positions itself with the periodically short-circuiting oscillatory circuit B1 in front of the pulse-signal-emitting coil of the oscillatory circuit A1 of the programming station 2. If damping is correct in relation to the sequence (this will be precisely explained hereinafter), the data prepared via the input unit 1 will be read via the oscillatory circuits A2/B2 into the code carrier 21. A timing channel operating via the oscillatory circuits A3/B3 supplies the working timing for this. At the same time, the oscillatory circuits B2 and B3 remain continuously open.

Then the code carrier 21 passes to the decoding station 3, of which an identification system can have a plurality, and is roughly adjusted at that place in relation to one of the oscillatory circuits. Fine adjustment takes place, as already mentioned, via the "positioning channel"—i.e., A1 (pulsating)/B1 (alternately short-circuited and open as a function of A2/B2). If a particular sequence is detected, the "timing channel" emits a starting pulse and the data flow can be released. In the position thus adjusted the previously inputted code information can be transmitted from B1 to A1. With this the positioning operation is completed and the reading operation established, but only for as long as the correct position is maintained. If the code detected is the correct one, it actuates the final control elements in the group of control elements 4, and the corresponding functions are activated via the switches 5. The read-out data are transmitted to a superordinate output unit for further data processing. Four functions can therefore be performed with three pairs of oscillatory circuits: timing (organization), reading, writing, positioning.

FIG. 2 shows in greater detail the programming and-/or decoding unit 10 and a positioned code carrier 21 of the plurality 20 of all code carriers. The air gap L between the two units can be up to several millimetres and tolerates deviations of a few millimetres. Proportionately, the programming-decoding station containers the majority of the electronic equipment—i.e., the switching parts for the whole organization of code distribution, reading and writing operation, positioning, coding-decoding, etc. For this purpose, for example, a single-chip microcontroller 6 is used which is connected to the outside world via an interface 7. On the code carrier side—i.e., the side on which the electronic equipment must be kept as small as possible, since a read-write unit is as a rule faced by a very large number of code carriers—the oscillatory circuits B1, B2, B3 have at the output merely means 22, 23, 24 for pulse processing, apart from the switch S, and the code data are preferably administered via a data store (e.g., RAM or EEPROM) with an I$^2$C bus (standard component 25). The required energy can readily be transmitted by the timing pulses, a realistic power consumption being less than 30 microwatts (3V; 10 $\mu$A). This creates a very attractive cost relationship between the electronics of the code carriers and the electronics of the code processing stations—in other words, a data carrier (store) has been contactlessly connected to a microcontroller, the usual galvanic connections being replaced by a contactless transmission principle, although the whole transmission apparatus is provided in the microcontroller and the data store.

With a gap width of a few millimetres between the code carrier and the read-write system, the read-write range is so great that enough data can be transferred even when the code carrier is moving past—i.e., without static positioning but with position recognition—to still exchange data bytes at a relative speed of approximately 500 mm/sec. This amount of data is fully adequate for rough recognition, for example, a zonal association of coded pallets, so that the process speed of a process monitored by means of the identification system with the apparatus and process according to the invention can be substantially increased.

Figure 5:
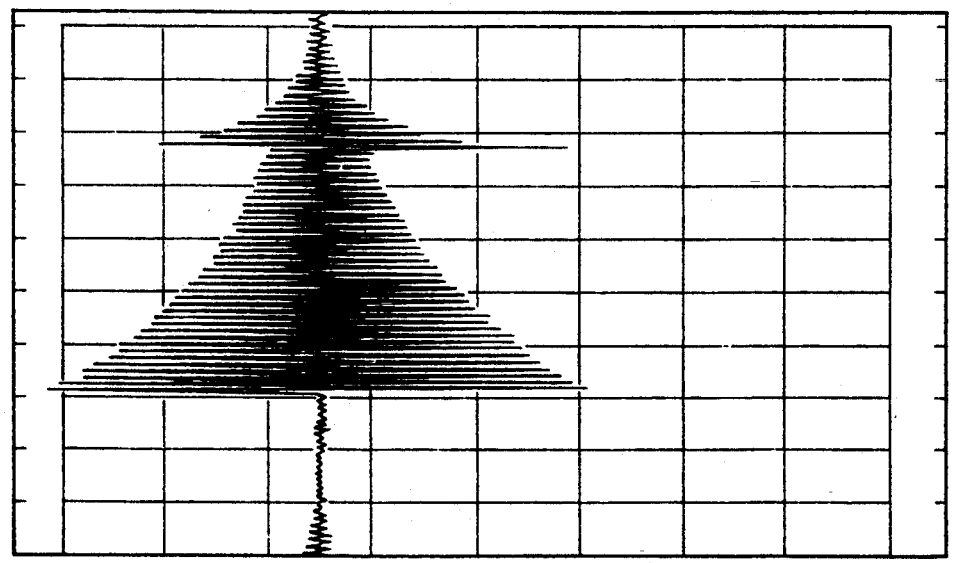

FIG. 5 shows a typical pulse response, as it appears in A1, excited by B1 in the reading channel and in the positioning channel. It is an oscillation which decays in an e function and which was triggered by the first flank of the pulse. The immediately following new decay was generated by the second flank of the pulse. FIG. 6 shows the same signal rectified, the envelope being used for further signal processing. A pulse length is of the order of magnitude of 5 to 50 μsec, the pulse repetition frequency being several kHz.

Figure 7:
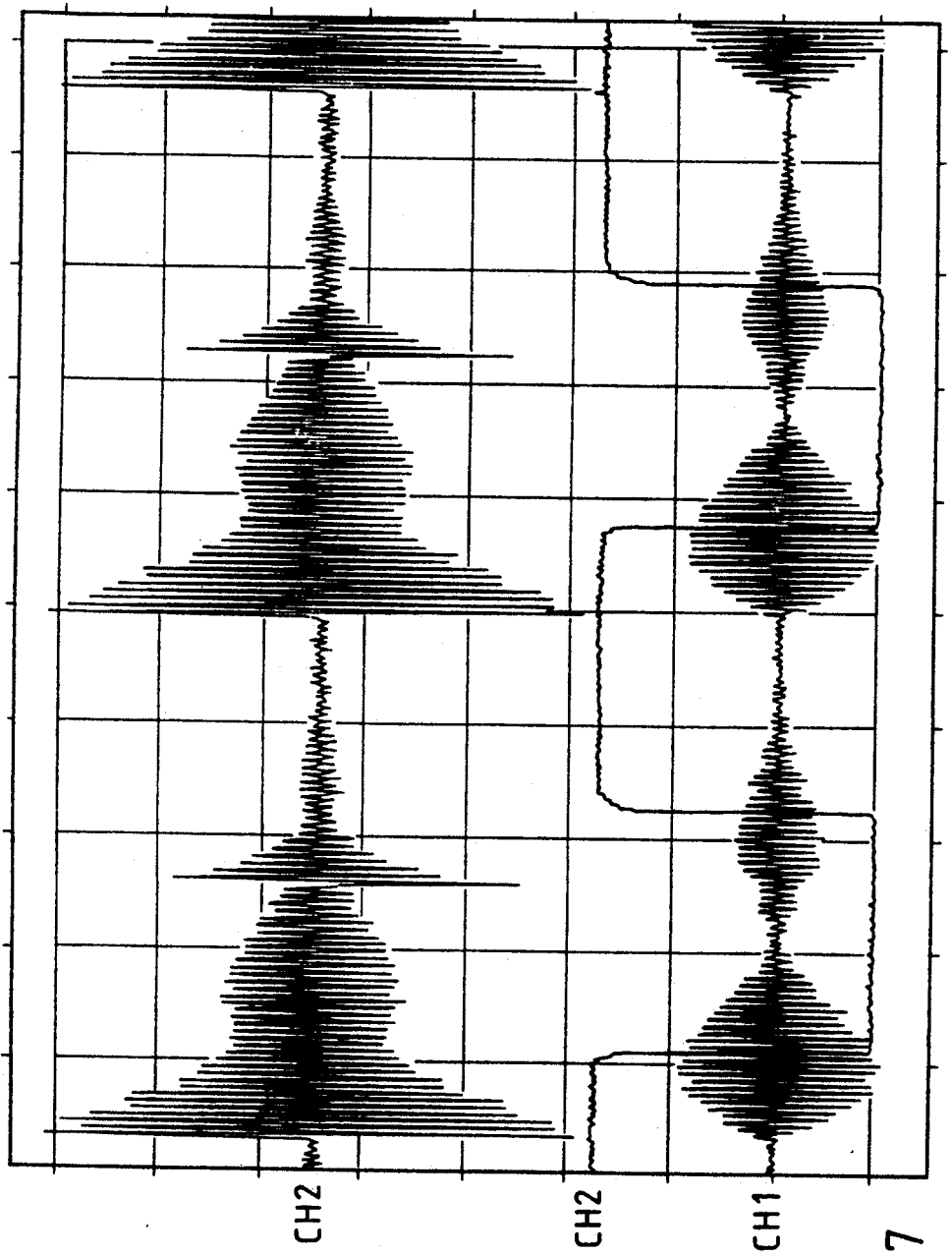

FIG. 7 shows a characteristic train of pulses CH2, as it is processed from the pulse response CH1 (above). The signal form CH2 (below) of the open LC circuits B2 and B3, oscillating is resonance, in shown on the primary side in dependence on the pulse response A2 and A3. In this case these pulse responses are not evaluated, since only a primary-secondary transmission is required. Basically it is immaterial whether a pulse is transmitted from one oscillatory circuit to the other, or whether after the input pulse has been switched off, the oscillatory circuit reacts to the same pulse with a subsequent pulse response. The process of transmission is used for timing-reading, the process of "back response" being used when a short-circuited oscillatory circuit receives pulses for positioning, and also for data back transmission and reading. FIGS. 8A and 8B illustrate the operation of the two transmission channels A1/B1 and A2/B2 during positioning. The drawing shows the transmission and recovery of a train of square wave pulses P2 by means of the controlled switch S in the oscillatory circuit B1. FIG. 8A shows the transmission of a sequence of pulses P2 through the oscillatory circuit A2 to the oscillatory circuit B2, at which as a response thereto a sequence of oscillations D2 appears. This sequence D2 is processed into a sequence of pulses P2* which exactly reproduces the original sequence of pulses P2 to be recovered. This sequence of pulses P2* controls the switch S in the oscillatory circuit B1. As a result, in relation to the sequence of pulses P2, the oscillatory circuit B1 behaves as a body which damps or does not damp the oscillatory circuit A1. If now, as shown in FIG. 8B, the oscillatory circuit B1 behaving as defined by the switching function, receives from the oscillatory circuit A1 a sequence of pulses P1, which in this case has twice the frequency of the sequence of pulses P2, the pulse response D1/D1* shown in FIG. 8B can be read off on the oscillatory circuit A1. This pulse response is a sequence of damped and undamped pulse decays in which the function of the train of pulses P2 is contained. By means of a discrimination of the pulse responses D1 from D1* or vice versa, the transmitted and damped recovered train of pulses P2 (back) can be confirmed by comparison with the original train of pulses P2. After confirmation the read or write process is enabled and the data flow can start. With this test transmission, here described in considerable detail, which is preferably integrated in the overall operation of the identification system, the correct positioning of the code carriers can not only be detected, but also produced at any time, the operation being included in the control of the process elements which are equipped with the code carriers and are to be coded and/or identified.

Compared with the speed of movement of a code carrier, the operation of position recognition (test) takes place very quickly. As a result the process is suitable on the one hand for positioning and on the other hand for position monitoring during a read or write function. In this way operating processes of all kinds can be performed.

For example, when a pallet marked with a code carrier is approaching, after a correct read position has been established (test), identity (data) can be interrogated even during movement. During this time the pallet, for example, continuously moves on, but the read-write standby control (test) remains in operation.

If the identity (data) is confirmed as correct, the pallet is stopped and further data either read from or written on the code carrier. Even during this operation the correct position is continuously monitored (test) and the data flow immediately interrupted if the correct position is abandoned (test negative), continuing again when, for example, the right position has been resumed by a correction (test positive). This ensures the required reliable data transmission in each of the transmission directions, even in conditions in which, for example, a code carrier is to be inscribed with data at a write station as it moves past, or is to be interrogated as it moves past a read station.

Figure 9:
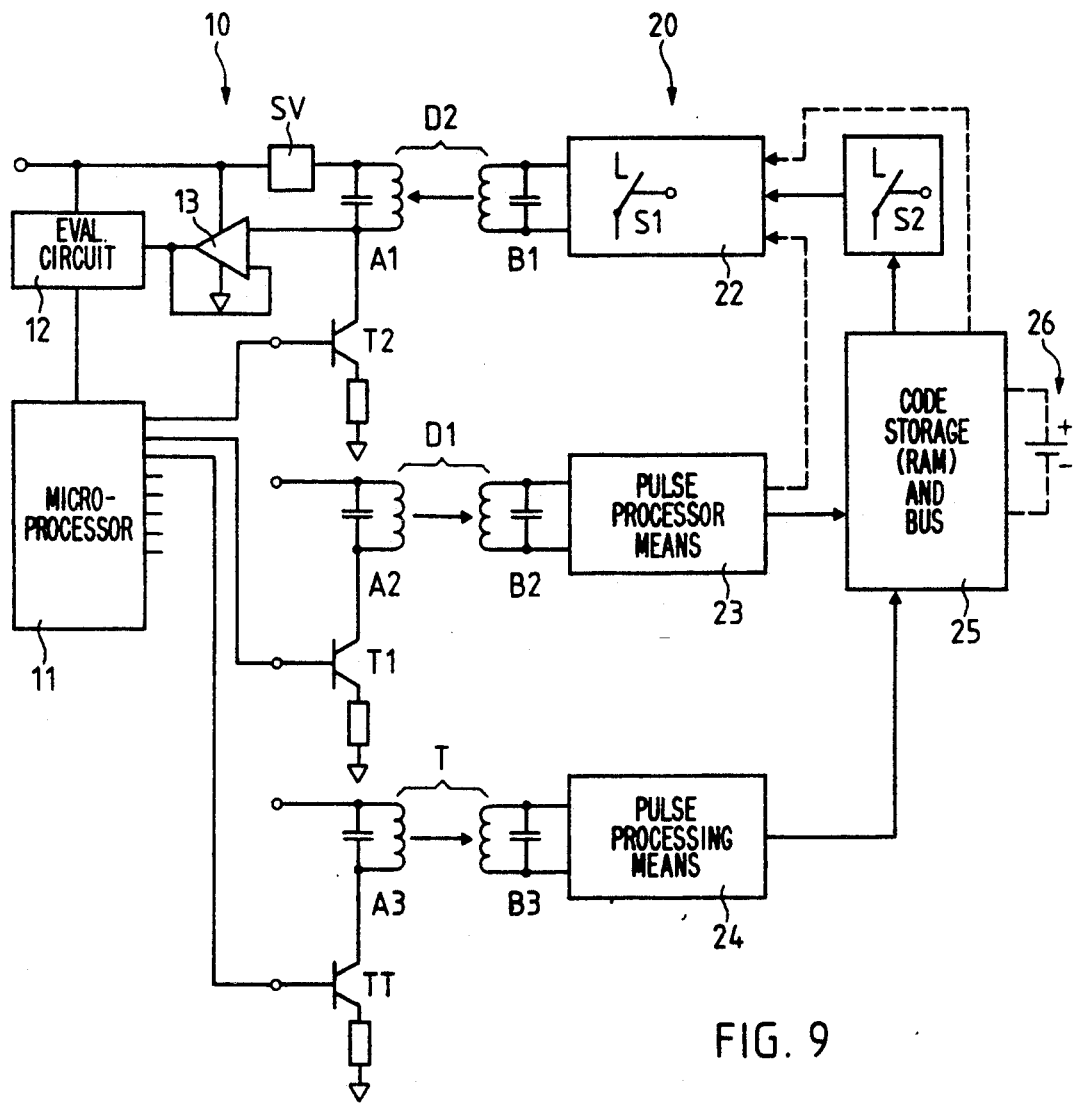
FIG. 9 shows in detail an embodiment of the apparatus comprising a read-write part and a code carrier.

FIG. 9 shows the apparatus according to the invention in greater detail. It comprises a read-write side 10 and a code carrier side 20 with the positioned data channels D1 and D2, and also a timing channel which can also be used simultaneously for energy transmission for the circuit on the code carrier. The read-write-positioning-supply unit 10 is connected to a current source V. In addition to other circuit parts, it comprises a microprocessor 11 (e.g., singlechip 80525), an evaluating circuit 12, 13 for evaluating the damping of the back pulses in the positioning and read channel, three oscillatory circuits A1, A2, A3 with their associated switching means, here shown in general as transistors whose bases (ports) are controlled by the microprocessor. The channels T and D1 operate in one direction (uni. - directionally) over the code carrier, although they can basically operate in both directions (bidirectionally). The data-positioning channel D2 operates in the opposite direction, even during the positioning process. The aforementioned Patent Specification discloses precisely just how signal damping and back response take place in the position recognition process.

The coding part 20 contains in addition to other circuit parts three oscillatory circuits B1, B2, B3 as partners of the oscillatory circuits on the side 10. The pulse processing means 22, 23, 24 are shown in general, but what is recommended is a Schmitt trigger and a monostable flip-flop (e.g., 4528). The storage part for the code is a RAM under the control of an $I^2C$ bus, this component being timed via the timing channel B3, 24. A PFC 8571 is recommended, although it must be boosted by a small current source (battery) 26, or a corresponding EEPROM, which receives the data in the store without a current source. The data are read via the write channel D1 into the component and read out of the component via the read channel D2. The switch S is actuated by the read side microprocessor, which organizes the positioning operation and adjusts data transmission in time via the timing channel. As a result, data exchange can take place.

An identification system produced with the devices here discussed and operated by the process here presented has unequalled flexibility, not only due to the unlimitedly large number of usable devices and code carriers, but also due to the ability of the code carriers to be recoded as often as required. Thus, in the middle of a process it is possible to recode any element at a moment when the code carrier is positioned at a write station, or when it is moving past a write station. The same thing is of course possible for the reading operation.

The apparatus is also very robust in operation. Correct data transmission is ensured even if the apparatus is, for example, vibrated, oscillated or shaken during operation. Instead of the transmission of faulty data, no data transmission whatever takes place, since transmission is permitted only when correct positioning and therefore reliable data transmission are ensured. The absolutely ideal distribution of the electronic means over stationary and moving parts in the transmission process according to the invention, namely with the three coil "distances" for ON data and OFF data, using a serial, operable data store with a small amount of interface apparatus on the data carrier side, allows a minimalized construction of the code carrier (moving part), thus making possible use in innumerable applications practically independently of size.

The inductive, contactless transmission process according to the pulse excitation/pulse response principle is suitable for non-galvanic connections or separations similar to the principle of the optocoupler. In this way data can be transmitted mainly from a stationary to a non-stationary component. In this way identification systems can be created which can be extended as required.

The positioning or position recognition, which makes smooth data transmission operation possible, is based on the transmission of a test function (series of pulses), which is used on the receiver side for a defined short-circuit sequence of a receiver side oscillatory circuit. The oscillatory circuit in question behaves like an alternately damped/undamped body in relation to the transmitter side partner oscillatory circuit, so that the pulse response from a "coherent" excitation of the partner oscillatory circuit contains the test function and can be filtered out. If after transmission and back transmission the test function reappears on the transmitter side, the condition for releasing data exchange has been met. An additional feature of the apparatus required for position recognition is the switching means for short circuiting one oscillatory circuit.

The switching function just described can also be used in general for data transmission. Writing operation will now be discussed as an example with reference to FIGS. 8 and 9. Let it be assumed that the sequence of pulses P2 (FIG. 8A) represents a string of data which is transmitted to the code carrier with the oscillatory circuits Bx, processed at that place and stored in the store 25 (e.g., a E²PROM). The back transmission of these data or other data from the store then takes place as follows: In the function of a string of data—i.e., a sequence of pulses—, the switch S1 is opened and closed, so that the data are reproduced as a serial damping pattern on the oscillatory circuit B1. If then the partner oscillatory circuit A1 is excited with a series of interrogation pulses, on the circuit A1 between the interrogation pulses a pulse response can be read off which, regarded as a whole, contains the data to be transmitted. The Reading operation can be so interlaced via a second switch S2 with position recognition that the transmission of data is continuously monitored.

The process heredisclosed for data transmission by means of an additional damping function provides the advantage of very definitely low-energy operation being possible on the side of the store 25 and in the pulse processing means 21, 22, 23 and the oscillatory circuits B1, B2, B3. If the read, write and timing unit with the oscillatory circuits Ax is called the A side and the, for example, code carrier with the store and the oscillatory circuits Bx are called the B side, the energy requirement can be described as follows. The energy for writing is supplied from the A side to the store on the B side, while the energy required for timing also comes from the A side. When the store is read out, the energy for timing and for the actuation of the switch S1 (and switch S2) in the oscillatory circuit B1 also comes from the A side—i.e., the A side so drives the code carrier that it exhibits on one oscillatory circuit a damping behaviour which exactly reproduces the data to be read out. In the partner oscillatory circuit the interrogation pulses are generated and the pulse response processed and evaluated with energy from the A side also. Regarded in this way, the B side behaves in a passive manner, comparable with a hologram which contains the information and is read by a laser beam—i.e., similarly to the interrogation activity of the A side.

Certain advantages of this process are evident. For example, it can be used in an identification system with stationary, energy-supplying and information-supplying read, write and timing units and a corresponding plurality of mobile code carriers which can be coded and recoded as required and read or written stationary or in movement, without the need to solve ticklish energy supply problems of the moving parts. The boosting battery 26 shown in FIG. 9 can be omitted if E²PROMs are used. In this respect a choice is possible, since a boosting battery can certainly permit years of operation.

We claim:

1. A process for positioning a data carrier relative to a data station comprising exciting a first oscillatory circuit on the data station with a series of discrete pulses, moving a second oscillatory circuit on a data carrier within the range of the electromagnetic field of the first circuit so that signals produced by the first oscillatory circuit are induced into the second oscillatory circuit, converting in the second circuit the signals induced therein into a second series of discrete pulses, exciting a third oscillatory circuit on the data station with a third series of discrete pulses having a repetition rate which is an integral multiple of the first series, moving a fourth oscillatory circuit on the data carrier into the range of the electromagnetic field of the third circuit, selectively damping and not damping the fourth circuit is accordance with a pattern determined by the second series of pulses, converting the pulse response of the third circuit into a fourth series of discrete pulses corresponding to the damping sequence of the fourth circuit, and varying the position of the data carrier relative to the data station until the forth series of pulses corresponds to the first series of pulses.

2. A process for contactless inductive confirmation of relative position and transmission of data between a pair of relatively movable first and second bodies comprising the steps of providing first and second circuits in said first and second bodies, respectively, each said circuit having an inductive member, moving one of the bodies through a position relative to the other in which each inductive member is within the range of influence of the electromagnetic field of the other, repetitively transmitting a first sequence of pulses from the first circuit to be received by the second circuit at said position by exciting the first circuit with a first data signal comprising a series of pulses to induce through the electromagnetic field in the second circuit a pulse sequence response, and in the second circuit, converting the pulse sequence response into a second data signal comprising a second sequence of pulses, coupling to a third circuit a third sequence of pulses including the same pattern as the second sequence of pulses concurrently with a sequence of pulses derived from the second data signal to form a combined sequence of signals, discriminating the combined sequence, comparing the combined sequence of pulses with the first sequence transmitted by the first circuit to verify that the information in the first sequence was received and retransmitted properly, the verification indicating proper relative positioning between the first and second bodies, and upon verification selectively transmitting data between the circuits.

3. A process according to claim 2 and including storing the second data signal in a data store for subsequent reading out.

4. A process according to claim 3 and including mounting the data store on a coding member on one of said bodies.

5. A process according to claim 2 wherein a plurality of pairs of first and second oscillatory circuits are provided to form transmission channels for, respectively, a read and write channel for data pulses and a timing channel for timing and control pulses.

6. A process according to claim 5 and including supporting the first circuit at a substantially stationary location and mounting the second circuit on the second body which is movable relative to the first circuit, the first circuit including providing a microprocessor at the stationary location, and controlling transmission and administering data to be transmitted with an inter-integrated-circuit bus on the second body.

7. A process according to claim 6 wherein the apparatus at the stationary location is a read/write unit and the second body is one of a plurality of similar bodies movable relative to the stationary location.

8. A process for determining the position of a data carrier relative to a data station comprising exciting a first oscillatory circuit on the data station with a first sequence of rectangular pulses, moving a second oscillatory circuit on a data carrier within the range of the electromagnetic field of the first circuit so that signals produced by the first oscillatory circuit are induced into the second oscillatory circuit, converting in the second circuit the signals induced therein into a second series of discrete pulses, damping a third oscillatory circuit on the data carrier during each pulse of the second sequence of pulses and concurrently exciting a fourth oscillatory circuit with a third series of pulses having a repetition rate which is an integral multiple of the first series while the third and fourth oscillatory circuits are magnetically coupled, thereby damping the resulting signals in the fourth circuit, discriminating the resulting pulses in the fourth circuit to obtain a sequence of pulses representing the pattern of the third sequence, comparing the first and third sequences of pulses, varying the position of the data carrier until the first and third sequences of pulses are the same, and then transmitting data between the data carrier and data station.

9. A process according to claim 8 including repeating the steps of exciting, moving, damping, discriminating and comparing and further comprising terminating the transmission of data when the first and third sequences of pulses are no longer the same.

10. An apparatus for the contactless, inductive determination of position between first and second relatively movable bodies and for the transmission of data therebetween comprising a pulse generator for producing a first series of rectangular pulses;

a first oscillatory circuit (A2) including a first inductive member on said first body connected to said pulse generator to receive said pulses, said first inductive member being electrically excited by said pulses, a second oscillatory circuit (B2) on said second body having a second inductive member movable into the field of said first inductive member so that when said second inductive member is in said field said second inductive member is excited and delivers energy to excite said second circuit into oscillation in response to each of the pulses of the first series;

a third oscillatory circuit on said second body, said third circuit including an inductive member and means for selectively damping and undamping oscillations therein;

a fourth oscillatory circuit having an inductive member of said first body, said fourth oscillatory circuit being electromagnetically coupled to said third circuit when said second inductive member is in the field of said first inductive member and the oscillations thereof being damped when said third circuit is damped;

processing means connected to said second circuit for receiving said pulse responses to said second circuit, converting said responses into a series of pulses and damping and undamping said third circuit in accordance with the pattern of pulses received;

means for feeding to said fourth circuit a series of pulses having a repetition rate twice that of said first series of pulses while said third circuit is being damped and for discriminating said pulses to determine which pulses are not damped, means for comparing said not damped pulses with said first series of pulses to determine when the two series are the same, thereby indicating a relative position between said first and second bodies suitable for data transmission.

* * * * *